(12) United States Patent
Mizuhara et al.

(10) Patent No.: US 7,374,013 B2
(45) Date of Patent: May 20, 2008

(54) ELECTRIC POWER STEERING APPARATUS

(75) Inventors: Masato Mizuhara, Takaishi (JP); Akio Osuka, Kashihara (JP); Shigeo Ishihara, Anjo (JP); Hisamitsu Hayashi, Handa (JP)

(73) Assignees: Favess Co., Ltd., Aichi (JP); Koyo Seiko Co., Ltd., Osaka (JP); Toyoda Koki Kabushiki Kaisha, Aichi (JP)

( * ) Notice: Subject to any disclaimer, the term of this patent is extended or adjusted under 35 U.S.C. 154(b) by 409 days.

(21) Appl. No.: 11/157,151

(22) Filed: Jun. 21, 2005

(65) Prior Publication Data

US 2006/0027416 A1 Feb. 9, 2006

(30) Foreign Application Priority Data

Jun. 22, 2004 (JP) ............... 2004-184213

(51) Int. Cl.
*B62D 5/04* (2006.01)
(52) U.S. Cl. ..................... 180/444; 74/459.5
(58) Field of Classification Search ............... 180/443, 180/444; 74/417, 423, 459.5
See application file for complete search history.

(56) References Cited

U.S. PATENT DOCUMENTS

| 2,183,285 A | 12/1939 | Wildhaber |
| 5,058,449 A * | 10/1991 | Lindsey ..................... 74/459.5 |

FOREIGN PATENT DOCUMENTS

| EP | 1 403 169 A2 | 3/2004 |
| GB | 758580 | 10/1956 |
| JP | 2556890 | 8/1997 |
| JP | 10-038036 | 2/1998 |

OTHER PUBLICATIONS

Wiener D: "Korrekturverfahren Fuer Kegelradverzahnungen" Antriebstechnik, Vereinigte Fachverlage, Mainz, DE, vol. 39, No. 6, Jun. 2000, pp. 36, 38-42, XP000936034.
Donno De M et al.: "Computerized Design, Generation and Simulation of Meshing of a Spiroid Worm-Gear Drive With a Ground Double-Crowned Worm" Transactions of the ASME Journal of Mechanical Design, American Society of Mechanical Engineers, New York, NY, US, vol. 121, No. 2, Jun. 1999, pp. 264-273, XP000901109.

* cited by examiner

*Primary Examiner*—Kevin Hurley
(74) *Attorney, Agent, or Firm*—Rabin & Berdo, PC

(57) ABSTRACT

An electric power steering apparatus comprises a steering assisting electric motor having an output shaft and a speed reduction mechanism. The speed reduction mechanism includes conical first and second gears to be engaged with each other. The first and second gears include a plurality of teeth each having a tooth surface. The mutually corresponding tooth surfaces of the first and second gears each include engaging regions to be engaged with each other. A center position in a tooth width direction of the engaging region of each tooth surface of the first gear in an unloaded state is offset by a first offset amount from center position in the tooth width direction of the tooth surface of the first gear to a relatively small end portion of the tooth of the first gear. A center position in a tooth width direction of the engaging region of each tooth surface of the second gear in an unloaded state is offset by a second offset amount from a center position in the tooth width direction of the tooth surface of the second gear to a relatively small end portion of the tooth of the second gear.

9 Claims, 3 Drawing Sheets

ELECTRIC POWER STEERING APPARATUS

BACKGROUND OF THE INVENTION

1. Field of the Invention

The present invention relates to an electric power steering apparatus.

2. Description of Related Arts

Rack-and-pinion steering apparatuses for providing a manual steering force caused by steering a steering member for a rack shaft via a pinion shaft include electric power steering apparatuses for providing an auxiliary steering force generated by an electric motor for a rack shaft.

For example, there have been provided so-called rack-assist electric power steering apparatuses which comprise a speed reduction mechanism including a first bevel gear attached to an output shaft of a steering assisting electric motor and a second bevel gear arranged around a rack shaft and engaged with the first bevel gear, so that a rotation of the second bevel gear is transformed into an axial shift of the rack shaft via a ball screw mechanism.

In recent years, a high level of silence has been demanded in electric power steering apparatuses.

However, when a load is applied to the first and second bevel gears of the speed reduction mechanism, the engagement between both bevel gears (so-called tooth contact) is deteriorated owing to flexure of the shafts that support the gears and teeth themselves. As a result, an abnormal sound owing to engaged sliding occurs, which causes noise.

Therefore, as a so-called pinion-assist electric power steering apparatus, which provides a pinion shaft with an assisting force, there has been provided an electric power steering apparatus for which sound deadening is attained by using a speed reducer including a worm and a worm wheel and by providing a synthetic resin-made tooth portion for the worm wheel (see Japanese Registered Utility Model Application No. 2556890, for example).

In addition, as a gear unit of hypoid gears, bevel gears or the like, there has been provided a gear unit for which, in order to reduce noise by improving the tooth contact, one or two directional components of three axial components of alignment regarding the shaft center of one gear are displaced by a predetermined correction amount (see Japanese Published Unexamined Patent Application No. H10-38036, for example).

In conical gears such as bevel gears, with only an adjustment of alignment as described above, an effect of an improved tooth contact is small. In addition, the tooth contact may become uneven left to right.

It is an object of the present invention to provide an electric power steering apparatus which can secure an appropriate tooth contact between conical gears engaged with each other and can reduce noise.

SUMMARY OF THE INVENTION

In order to achieve the above-described object, an electric power steering apparatus of a mode of the present invention comprises a steering assisting electric motor having an output shaft, and a speed reduction mechanism. The speed reduction mechanism includes a conical first gear joined with the output shaft of the electric motor and a conical second gear to be engaged with the first gear. The first gear includes a plurality of teeth each having a tooth surface. Each tooth of the first gear includes a relatively large end portion and a relatively small end portion mutually opposed in a tooth width direction. The second gear includes a plurality of teeth each having a tooth surface. Each tooth of the second gear includes a relatively large end portion and a relatively small end portion mutually opposed in a tooth width direction. The mutually corresponding tooth surfaces of the first and second gears each include engaging regions to be engaged with each other. A center position in the tooth width direction of the engaging region of each tooth surface of the first gear in an unloaded state is offset by a first offset amount from a center position in the tooth width direction of the tooth surface of the first gear to the relatively small end portion of the tooth of the first gear. A center position in the tooth width direction of the engaging region of each tooth surface of the second gear in an unloaded state is offset by a second offset amount from a center position in the tooth width direction of the tooth surface of the second gear to the relatively small end portion of the tooth of the second gear.

In the present mode, in a loaded state where the first and second gears actually transmit torque, the center positions of the engaging regions can be aligned in general with the center positions of the tooth width. Thereby, an appropriate engaging condition can be achieved. As a result, an abnormal sound owing to engaged sliding of both gears during torque transmission can be suppressed to reduce noise.

DETAILED DESCRIPTION OF THE PREFERRED EMBODIMENTS

Figure 1:
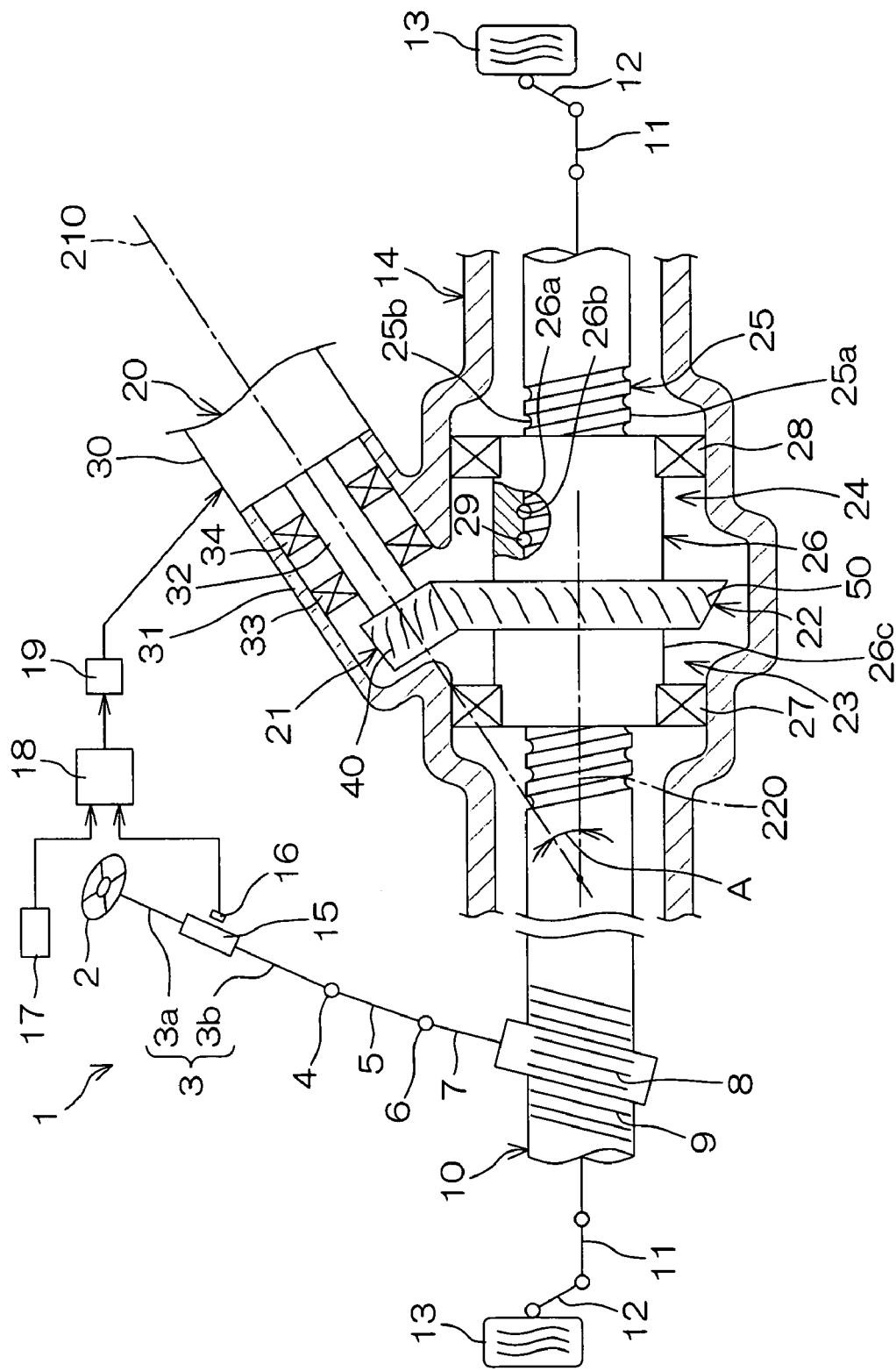
FIG. 1 is a schematic sectional view showing a schematic construction of an electric power steering apparatus of an embodiment of the present invention.

A preferred embodiment of the present invention will be described with reference to the accompanying drawings. FIG. 1 is a schematic view showing an outline construction of an electric power steering apparatus of an embodiment of the present invention. Referring to FIG. 1, an electric power steering apparatus (EPS) 1 comprises a steering shaft 3 which is joined with a steering member 2 composed of a steering wheel or the like, an intermediate shaft 5 joined with the steering shaft 3 via a universal joint 4, a pinion shaft 7 joined with the intermediate shaft 5 via a universal joint 6, and a rack shaft 10 as being a steering shaft extending in the leftward and rightward directions of a vehicle while having rack teeth 9 engaged with a pinion 8 provided at a front-end portion of this pinion shaft 7.

Tie rods 11 are respectively coupled to a pair of end portions of the rack shaft 10. Each tie rod 11 is joined to a corresponding wheel 13 via a corresponding knuckle arm 12. The rack shaft 10 is supported so as to be freely shiftable in the axis direction by a rack housing 14 via an unillustrated bearing. Although unillustrated, a rack shaft supporting unit is provided at a side opposite the pinion 8 across the rack shaft 10. This rack shaft supporting unit restrains the rack shaft 10 from rotating while allowing an axial shift of the rack shaft 10, and also presses the rack shaft 10 to the pinion 8 to suppress play in engagement between the rack shaft 10 and the pinion 8.

When the steering shaft 3 is rotated by an operation of the steering member 2, this rotation is transformed by the pinion 8 and the rack teeth 9 into a linear movement of the rack shaft 10 along the leftward and rightward directions of a vehicle. Thereby, steering of the wheels 13 is attained.

The steering shaft 3 is divided into an input shaft 3a connected to the steering member 2 and an output shaft 3b as being a driven shaft connected to the pinion shaft 7, and the input shaft 3a and the output shaft 3b are mutually joined on an identical axis line via a torsion bar 15.

A torque sensor 16 for detecting steering torque based on an amount of relative rotational displacement between the input shaft 3a and the output shaft 3b via the torsion bar 15 is provided, and results of a torque detection by the torque sensor 16 and results of a vehicle speed detection from a vehicle speed sensor 17 are provided to a control section 18 composed of an electronic control unit (ECU), for example.

The control section 18 controls drive of a steering assisting electric motor 20 based on the results of a torque detection and results of a vehicle speed detection via a drive circuit 19. An output rotation from the electric motor 20 is transformed into an axial shift of the rack shaft 10 via a speed reduction mechanism 23 including, for example, first and second bevel gears 21 and 22 and a motion transforming mechanism 24 composed of, for example, a ball screw mechanism, and as a result, steering assistance is achieved. The first and second bevel gears 21 and 22 are each composed of a spiral bevel gear.

Concretely, a screw shaft 25 is formed at an axial intermediate portion of the rack shaft 10, and circumference of this screw shaft 25 is concentrically surrounded by a rotatory barrel 26 composed of a ball nut. The rotary barrel 26 is supported on the rack housing 14 via a pair of bearings 27 and 28 and is also restricted, by the bearings 27 and 28, from shifting in a corresponding axis direction.

A plurality of rolling elements 29 such as balls are interposed between a spiral thread groove 25b of an outer circumference 25a of the screw shaft 25 and a spiral thread groove 26b of an inner circumference 26a of the rotary barrel 26, and the rotary barrel 26 is screwed with the screw shaft 25 via the rolling elements 29. In addition, the rolling elements 29 are circulated in the thread grooves 25b and 26b by means of an unillustrated mechanism well known in this art.

A motor housing 30 of the electric motor 20 is fixed to an end portion of a cylindrical coupler housing 31 which is coupled to the rack housing 14 in a crossing manner. An output shaft 32 of the electric motor 20 is freely rotatably supported by the coupler housing 31 via a pair of bearings 33 and 34.

The first bevel gear 21 of the speed reduction mechanism 23 is fixed to the front end of the output shaft 32 so as to be integrally rotatable. In addition, the second bevel gear 22 is fixed to an outer circumference 26c of the rotary barrel 26 so as to be integrally rotatable. A crossing angle A between a rotation axis line 210 of the first bevel gear 21 and a rotation axis line 220 of the second bevel gear 22 is set to 20 degrees or more but less than 90 degrees.

Figure 2:
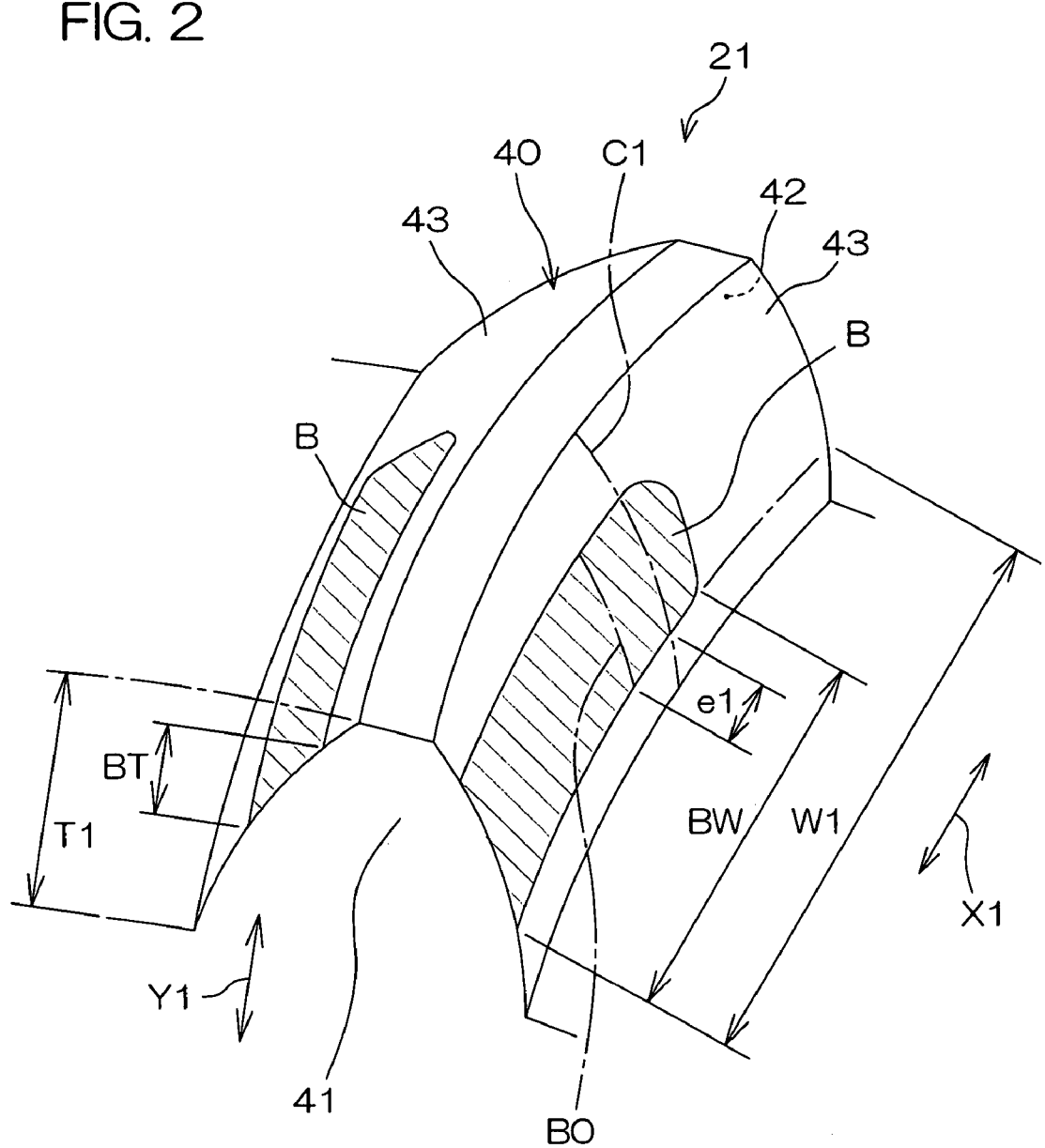
FIG. 2 is a schematic perspective view of a first bevel gear.

Next, FIG. 2 is a schematic perspective view of a tooth 40 of the first bevel gear 21, wherein engaging regions (contact regions) B, where the first bevel gear 21 is engaged with the second bevel gear 22 in an unloaded state, are shown with hatching.

Referring to FIG. 2, the tooth 40 of the first bevel gear 21 has a small end 41 and a large end 42. A center position B0 in a tooth width direction X1 of the engaging region B, which is disposed on a tooth surface 43 of the tooth 40 of the first bevel gear 21 in unloaded state, is offset by a predetermined offset amount e1 from a center position C1 in the tooth width direction X1 of the tooth surface 43 as a whole to the small end 41.

It is preferable that this offset amount e1 is within a range of 10 to 30% of a tooth width W1 of the tooth 40 (that is, $0.1 \cdot W1 \leq e1 \leq 0.3 \cdot W1$ is satisfied).

In addition, it is preferable that an overall length BW in the tooth width direction X1 of the engaging region B in unloaded state is within a range of 20 to 70% of the tooth width W1 (that is, $0.2 \cdot W1 \leq BW \leq 0.7 \cdot W1$ is satisfied).

In addition, it is preferable that an overall length BT in a tooth height direction Y1 of the engaging region B in unloaded state is within a range of 30 to 70% of a tooth height amount T1 of the tooth 40 (that is, $0.3 \cdot T1 \leq BT \leq 0.7 \cdot T1$ is satisfied).

Figure 3:
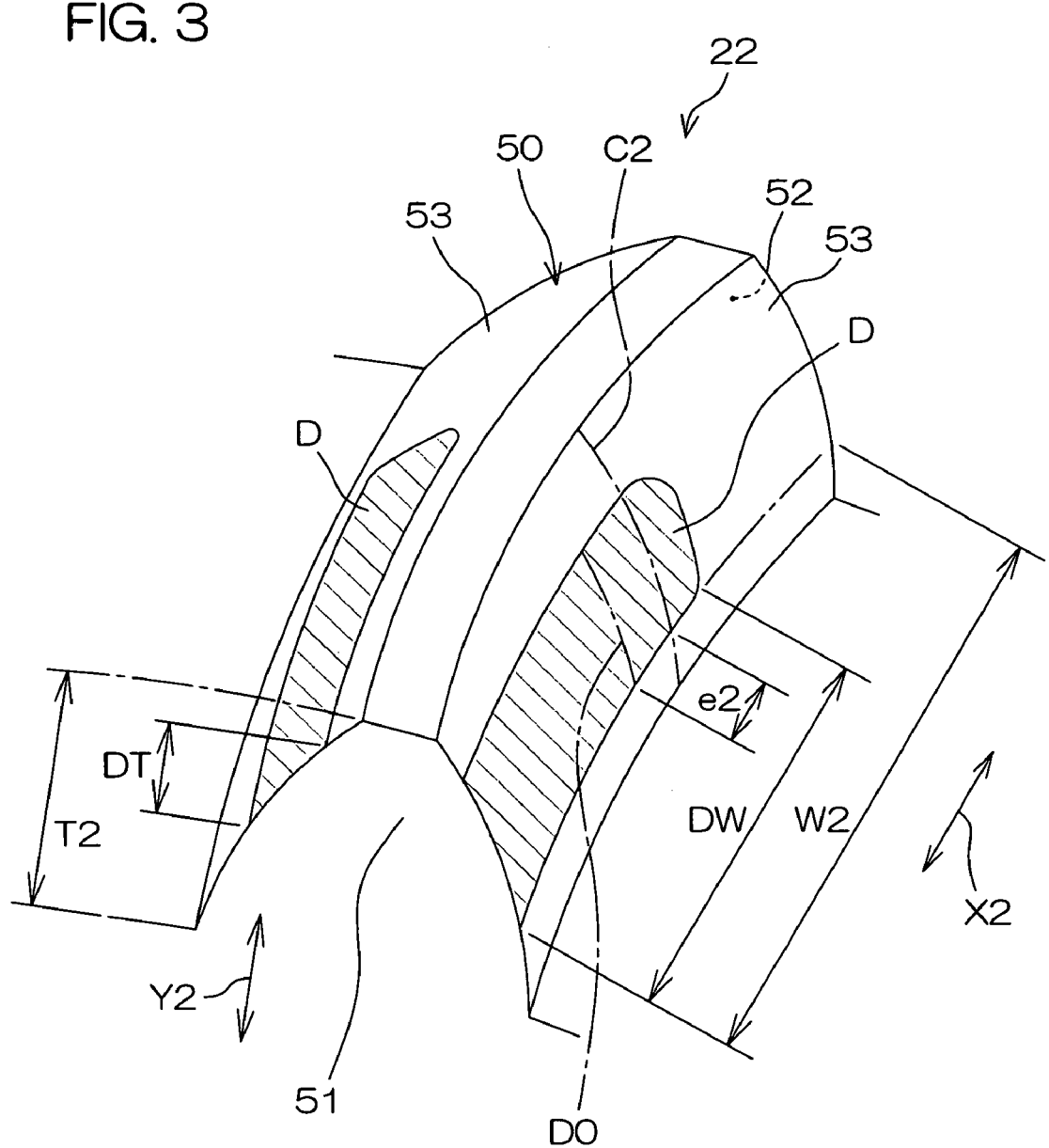
FIG. 3 is a schematic perspective view of a second bevel gear.

Next, FIG. 3 is a schematic perspective view of a tooth 50 of the second bevel gear 22, wherein engaging regions (contact regions) D, where the second bevel gear 22 is engaged with the first bevel gear 21 in an unloaded state, are shown with hatching.

Referring to FIG. 3, the tooth 50 of the second bevel gear 22 has a small end 51 and a large end 52. A center position D0 in a tooth width direction X2 of the engaging region D, which is disposed on a tooth surface 53 of the tooth 50 of the second bevel gear 22 in unloaded state, is offset by a predetermined offset amount e2 from a middle position C2 in the tooth width direction X2 of the tooth surface 53 as a whole to the small end 51.

It is preferable that this offset amount e2 is within a range of 10 to 30% of a tooth width W2 of the tooth 50 (that is, $0.1 \cdot W2 \leq e2 \leq 0.3 \cdot W2$ is satisfied).

In addition, it is preferable that an overall length DW in the tooth width direction X2 of the engaging region D in unloaded state is within a range of 20 to 70% of the tooth width W2 of the tooth 50 (that is, $0.2 \cdot W2 \leq DW \leq 0.7 \cdot W2$ is satisfied).

In addition, it is preferable that an overall length DT in a tooth height direction Y2 of the engaging region D in unloaded state is within a range of 30 to 70% of a tooth height amount T2 of the tooth 50 (that is, $0.3 \cdot T2 \leq DT \leq 0.7 \cdot T2$ is satisfied).

According to the present embodiment, in a loaded state where the first and second bevel gears 21 and 22 actually transmit torque, when flexure of the output shaft 32 and rack shaft 10 occurs, offset with the above-described offset amounts e1 and e2 is eliminated, and the center positions B0 and D0 of the engaging regions B and D of the bevel gears 21 and 22 are aligned generally with the middle positions C1 and C2 in the tooth widths of the corresponding teeth 40 and 50, respectively.

Thereby, an appropriate engaging condition can be achieved in a loaded state. As a result, an abnormal sound owing to engaged sliding of both bevel gears 21 and 22 during torque transmission can be suppressed to greatly reduce noise.

In particular, since the above-described offset amounts e1 and e2 have been respectively set within ranges of 10 to 30% of the corresponding tooth widths W1 and W2, it becomes possible, in a loaded state, to securely dispose engaging positions of both bevel gears 21 and 22 at appropriate positions. Namely, when the offset amounts e1 and e2 are less than 10% or more than 30% of the corresponding tooth widths W1 and W2, it may not be possible for the center positions B0 and D0 of the engaging regions to be aligned with the center positions C1 and C2 of the tooth widths in a loaded state. Therefore, the offset amounts e1 and e2 have been respectively set within the ranges of 10 to 30% of the corresponding tooth widths W1 and W2.

In addition, since the overall lengths BW and DW in the tooth width directions X1 and X2 of the engaging regions B and D of the bevel gears 21 and 22 in an unloaded state have been respectively set within ranges of 20 to 70% of the corresponding tooth widths W1 and W2 of the tooth surfaces 43 and 53 as a whole of the respectively corresponding tooth 40 and 50, sufficient engaging lengths can be secured to further suppress a sliding abnormal sound from occurring. Here, when the above-described overall lengths BW and DW exceed 70% of the corresponding tooth widths W1 and W2, there is a problem that the center positions B0 and D0 of the engaging regions are unable to be aligned with the center positions C1 and C2 of the tooth widths in a loaded state. Consequently, the overall lengths BW and DW have been set to less than or equal to 70% of the tooth widths W1 and W2.

In the above-described embodiment, by using spiral teeth as the teeth 40 and 50 of the first and second bevel gears 21 and 22, contact ratio can be improved to further reduce noise. In addition, with spiral teeth, high-precision gears can be obtained. Spiral teeth are preferably used particularly because these effects can be achieved without changing peripheral structures, fitting processes or the like.

Here, the present invention is not limited to the embodiment as described above, but for example, the conical gears may be hypoid gears. In addition, as the motion transforming mechanism 24, a bearing screw mechanism well known in this art may be used in place of the above-described ball screw mechanism.

As in the above, the present invention has been described in detail by a concrete embodiment, a person skilled in the art who has understood the above-described contents will easily conceive modifications, alterations, and equivalents thereof. Accordingly, the present invention should have a scope of claims and a scope of equivalents thereof.

The present application is a counterpart of Japanese Patent Application No. 2004-184213 submitted on Jun. 22, 2004 to the Japan Patent Office, and the entire disclosure of this application is herein incorporated by reference.

What is claimed is:

1. An electric power steering apparatus comprising:
a steering assisting electric motor having an output shaft; and
a speed reduction mechanism, wherein
the speed reduction mechanism includes a conical first gear joined with the output shaft of the electric motor and a conical second gear to be engaged with the first gear,
the first gear includes a plurality of teeth each having a tooth surface,
each tooth of the first gear includes a relatively large end portion and a relatively small end portion mutually opposed in a tooth width direction,
the second gear includes a plurality of teeth each having a tooth surface,
each tooth of the second gear includes a relatively large end portion and a relatively small end portion mutually opposed in a tooth width direction,
the mutually corresponding tooth surfaces of the first and second gears each include engaging regions to be engaged with each other,
a center position in the tooth width direction of the engaging region of each tooth surface of the first gear in an unloaded state is offset by a first offset amount from a center position in the tooth width direction of the tooth surface of the first gear to the relatively small end portion of the tooth of the first gear, and
a center position in the tooth width direction of the engaging region of each tooth surface of the second gear in an unloaded state is offset by a second offset amount from a center position in the tooth width direction of the tooth surface of the second gear to the relatively small end portion of the tooth of the second gear.

2. The electric power steering apparatus according to claim 1, wherein
the first offset amount is within a range of 10 to 30% of the tooth width of the first gear.

3. The electric power steering apparatus according to claim 1, wherein
the second offset amount is within a range of 10 to 30% of the tooth width of the second gear.

4. The electric power steering apparatus according to claim 1, wherein
a length in the tooth width direction of the engaging region of each tooth surface of the first gear in the unloaded state is within a range of 20 to 70% of the tooth width of the first gear.

5. The electric power steering apparatus according to claim 1, wherein
a length in the tooth width direction of the engaging region of each tooth surface of the second gear in the unloaded state is within a range of 20 to 70% of the tooth width of the second gear.

6. The electric power steering apparatus according to claim 1, wherein
a length in a tooth height direction of the engaging region of each tooth surface of the first gear in the unloaded state is within a range of 30 to 70% of a tooth height of the first gear.

7. The electric power steering apparatus according to claim 1, wherein
a length in a tooth height direction of the engaging region of each tooth surface of the second gear in the unloaded state is within a range of 30 to 70% of a tooth height of the second gear.

8. The electric power steering apparatus according to claim 1, wherein
the first and second gears each includes bevel gear engaged with each other.

9. The electric power steering apparatus according to claim 8, wherein
the bevel gear includes spiral bevel gear.

* * * * *